United States Patent
Brackett, Sr.

(10) Patent No.: US 9,596,838 B2
(45) Date of Patent: Mar. 21, 2017

(54) FISH HOOK SETTING DEVICE

(71) Applicant: Jerk It, LLC, Bokoshe, OK (US)

(72) Inventor: Paul E. Brackett, Sr., Van Buren, AR (US)

(73) Assignee: Jerk It, LLC, Bokoshe, OK (US)

( * ) Notice: Subject to any disclaimer, the term of this patent is extended or adjusted under 35 U.S.C. 154(b) by 106 days.

(21) Appl. No.: 14/793,025

(22) Filed: Jul. 7, 2015

(65) Prior Publication Data

US 2016/0015016 A1    Jan. 21, 2016

Related U.S. Application Data

(60) Provisional application No. 62/024,677, filed on Jul. 15, 2014.

(51) Int. Cl.
*A01K 97/12* (2006.01)
*A01K 91/10* (2006.01)

(52) U.S. Cl.
CPC .............. *A01K 91/10* (2013.01); *A01K 97/12* (2013.01)

(58) Field of Classification Search
CPC ......... A01K 91/06; A01K 91/10; A01K 93/02
USPC ............................................................ 43/15
See application file for complete search history.

(56) References Cited

U.S. PATENT DOCUMENTS

| | | | |
|---|---|---|---|
| 2,481,453 A | 9/1949 | Stadelhofer | |
| 2,568,999 A * | 9/1951 | Gunser | A01K 91/10 43/15 |
| 2,784,515 A | 3/1957 | McBride et al. | |
| 2,790,263 A * | 4/1957 | Chaney | A01K 93/02 43/17 |
| 2,801,487 A | 8/1957 | Morgan | |
| 3,660,922 A | 5/1972 | Chill | |
| 3,766,679 A | 10/1973 | Noe | |
| 3,766,680 A * | 10/1973 | Torme | A01K 93/02 43/16 |
| D371,421 S | 7/1996 | Brackett, Sr. | |
| 5,937,565 A * | 8/1999 | Maric | A01K 91/10 43/15 |
| 6,493,981 B2 * | 12/2002 | Izzard | A01K 93/00 43/15 |
| 6,966,139 B2 | 11/2005 | Izzard | |
| 7,849,629 B1 * | 12/2010 | Adcock | A01K 91/10 43/15 |
| 2005/0210730 A1 * | 9/2005 | Izzard | A01K 93/02 43/15 |

* cited by examiner

*Primary Examiner* — Richard G Davis
(74) *Attorney, Agent, or Firm* — Crowe & Dunlevy, P.C.

(57) ABSTRACT

A fish hook setting device having a housing with longitudinal passage, a collet shaft slideably received within the longitudinal passage of the housing, a trigger assembly comprising a trigger rod slideably received within the collet shaft and a collet, and a biasing member engaged with the collet shaft. When the device is in a cocked state, the biasing member is compressed, and when the device is in an un-cocked state, the biasing member is decompressed. When a fish bites on the bait of the hook, the device is triggered from the cocked state to the un-cocked state as the trigger rod and the collet shaft are forced upwards by the biasing member to set the hook into the mouth of the fish.

20 Claims, 5 Drawing Sheets

FISH HOOK SETTING DEVICE

CROSS-REFERENCE TO RELATED APPLICATIONS

This application claims priority to and the benefit of U.S. Provisional Patent Application Ser. No. 62/024,677, filed Jul. 15, 2014, which is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates to a fish hook setting device, and more particularly to a fish hook setting device with a biasing member biased trigger assembly that rapidly sets the baited hook in the mouth of the fish.

2. Description of the Related Art

During the sport of fishing, it is essential to react to a fish's bite on the bait of the hook in order to set the hook in the mouth of the fish, thereby catching the fish. Under certain circumstances, such as with an unexperienced fisherman or when the fish bites quickly or almost unbeknownst to the fisherman, the fisherman misses their opportunity to set the hook in the mouth of the fish before the fish gets away.

Therefore, it is desirable to provide an improved fish hook setting device.

It is further desirable to provide a fish hook setting device that rapidly and without action on the part of the fisherman sets the hook in the mouth of the fish as the fish bites at the bait on the hook.

Other advantages and features will be apparent from the following description, and from the claims.

BRIEF SUMMARY OF THE INVENTION

In general, in a first aspect, the invention relates to a fish hook setting device having an elongated housing having an upper end, a lower end and a longitudinal passage. The device includes a collet shaft having a longitudinal passage, an upper portion a lower portion, and an intermediate shoulder. The collet shaft is slideably positioned within the longitudinal passage of the elongated housing. A trigger assembly is positioned within the longitudinal passage of the elongated housing, and is engaged with the collet shaft. The device also includes a biasing member positioned within the longitudinal passage of the elongated housing. Similar to the trigger assembly, the biasing member engaged with the collet shaft. The device has a cocked state and an un-cocked state with the biasing member being compressed in the cocked state and the biasing member being decompressed in the un-cocked state. Additionally, the collet shaft, the trigger assembly and the biasing member are coaxially aligned within the longitudinal passage of the elongated housing.

The trigger assembly of the fish hook setting device can include a trigger rod and a collet. The trigger rod includes a longitudinal passage, an upper terminal end and a lower terminal end, and is slideably positioned within the longitudinal passage of the collet shaft. The collet is concentrically positioned between the lower portion of the collet shaft and the lower terminal end of the trigger rod.

The fish hook setting device may include a buoyant floater having a longitudinal bore with a lower end and an upper end. The housing can be retained within the upper end of the longitudinal bore of the floater by a retaining chamber. The retaining chamber includes an upper receptacle, an intermediate shoulder and a longitudinal bore. The retaining chamber may be a pair of bisected components having an internal channel, with the upper end of the housing having a radially protruding shoulder retained within the internal channel of the retaining chamber. The retaining chamber may also be an insert constructed to fit within the upper end of the housing, with the insert having a depressible latch capable of being received into a latch opening in the upper end of the housing.

The fish hook setting device can also include a biasing member support having a tapered upper end, a flanged lower end and a central longitudinal bore. The biasing member support is engaged with the biasing member. The biasing member and the biasing member support may be concentrically positioned about the lower portion of the collet shaft, and the biasing member can be positioned between the intermediate stop of the collet shaft and the flanged lower end of the biasing member support. Moreover, the housing can include a segmentary shoulder engaged with the biasing member.

The collet shaft of the fish hook setting device can also include a receptacle terminating at the upper portion and a tapered outer collar terminating at the lower portion. An upper cap can be in communication with the receptacle of the collet shaft. In addition, an end cap can be attached to the lower end of the housing, with the end cap having an extension chamber and an outlet. Moreover, the collet shaft can include at least one slot opening at the lower portion of the collet shaft.

In general, in a second aspect, the invention relates to a fish hook setting device with a housing having an upper end, a lower end and a longitudinal passage. A collet shaft is slideably positioned within the longitudinal passage of the housing, and the collet shaft includes an upper end, a lower end, an intermediate stop, and a longitudinal passage. A trigger rod is slideably positioned within the longitudinal passage of the collet shaft, and the trigger rod has an upper terminal end, a lower terminal end and a fishing line passage. A collet is concentrically positioned between the lower end of the collet shaft and the lower terminal end of the trigger rod. A biasing member is positioned within the longitudinal passage of the housing, and the biasing member engaged with the intermediate stop of the collet shaft. The collet shaft, the trigger rod and the collet are coaxially aligned with the longitudinal passage of the housing.

The fish hook setting device can also include a chamber constructed of a pair of bisected components having an internal channel, and the upper end of the housing can have a radially protruding shoulder retained within the internal channel of the chamber. Alternatively, the chamber can have an insert constructed to fit within the upper end of the housing, and the insert has a depressible latch capable of being received into a latch opening in the housing.

DETAILED DESCRIPTION OF THE INVENTION

Figure 1:
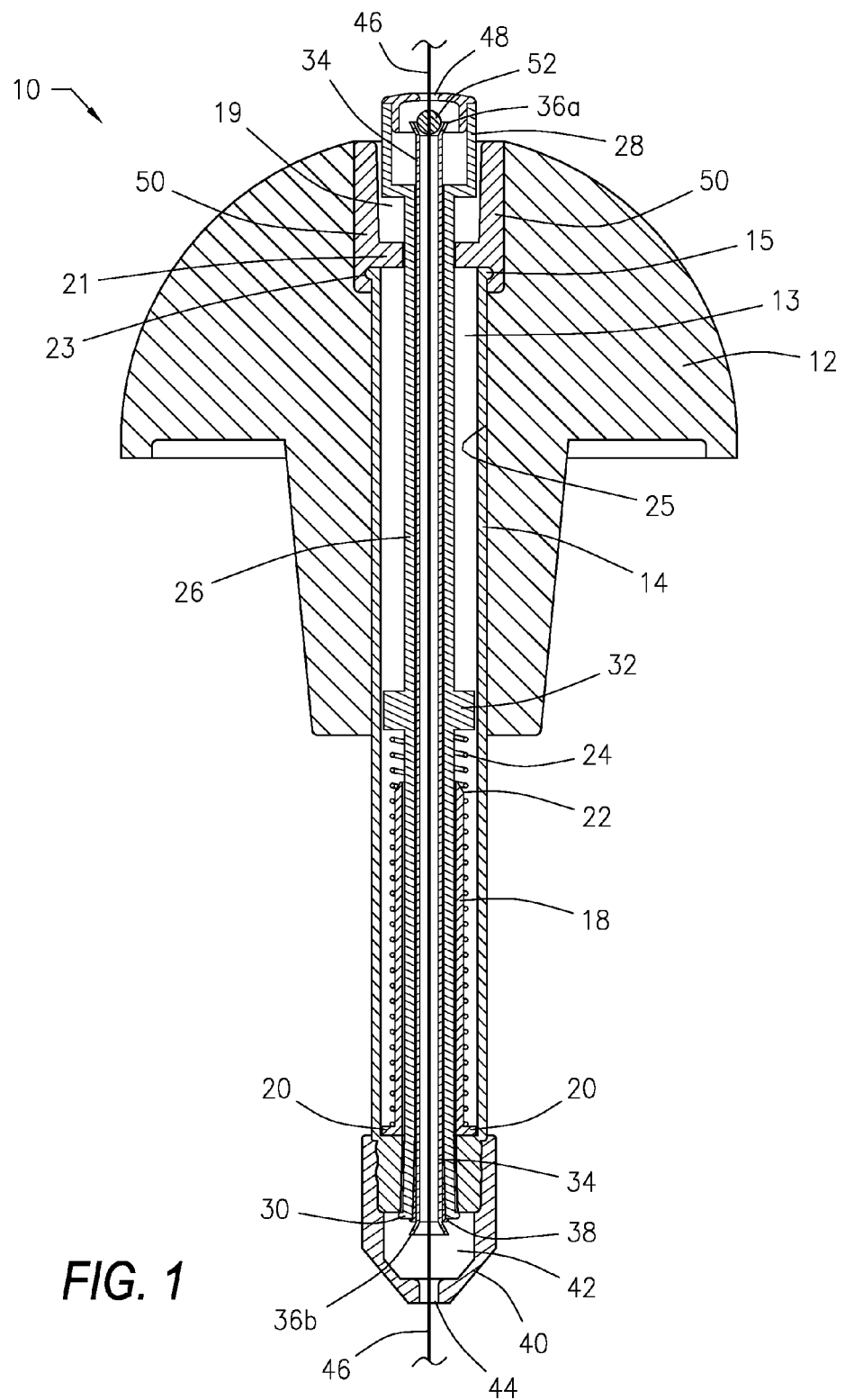
FIG. 1 is a sectional view of an example of a fish hook setting device and floater in accordance with an illustrative embodiment of the invention disclosed herein.

The devices and methods discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Referring now to the figures of the drawings, wherein like numerals of reference designate like elements throughout the several views, the invention relates to improvements in fish hook setting devices that may be used with commercially available and existing fishing rods and equipment. The invention is directed to a fish hook setting device 10 that is used in conjunction with a floater 12. The floater 12 may be composed of any type of buoyant material, such as wood, cork, plastic or polystyrene, in order to remain above water during use. The floater 12 includes a central longitudinal bore having a lower end and an upper end. The diameter of the upper end of the bore is larger than the diameter of the lower end.

Figure 2:
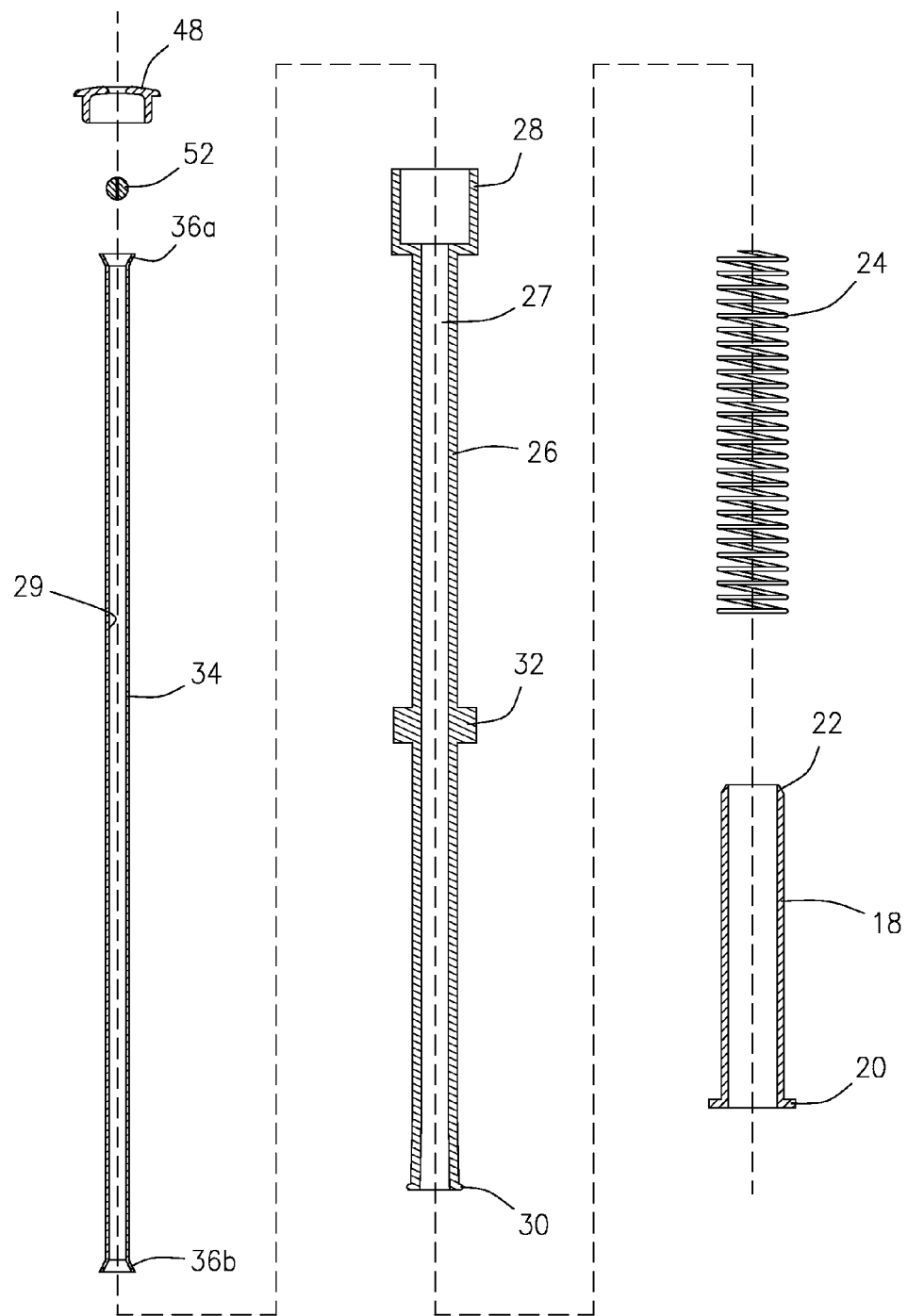
FIG. 2 is a sectional exploded view of an example of a trigger assembly in accordance with an illustrative embodiment of the invention disclosed herein.
Figure 3:
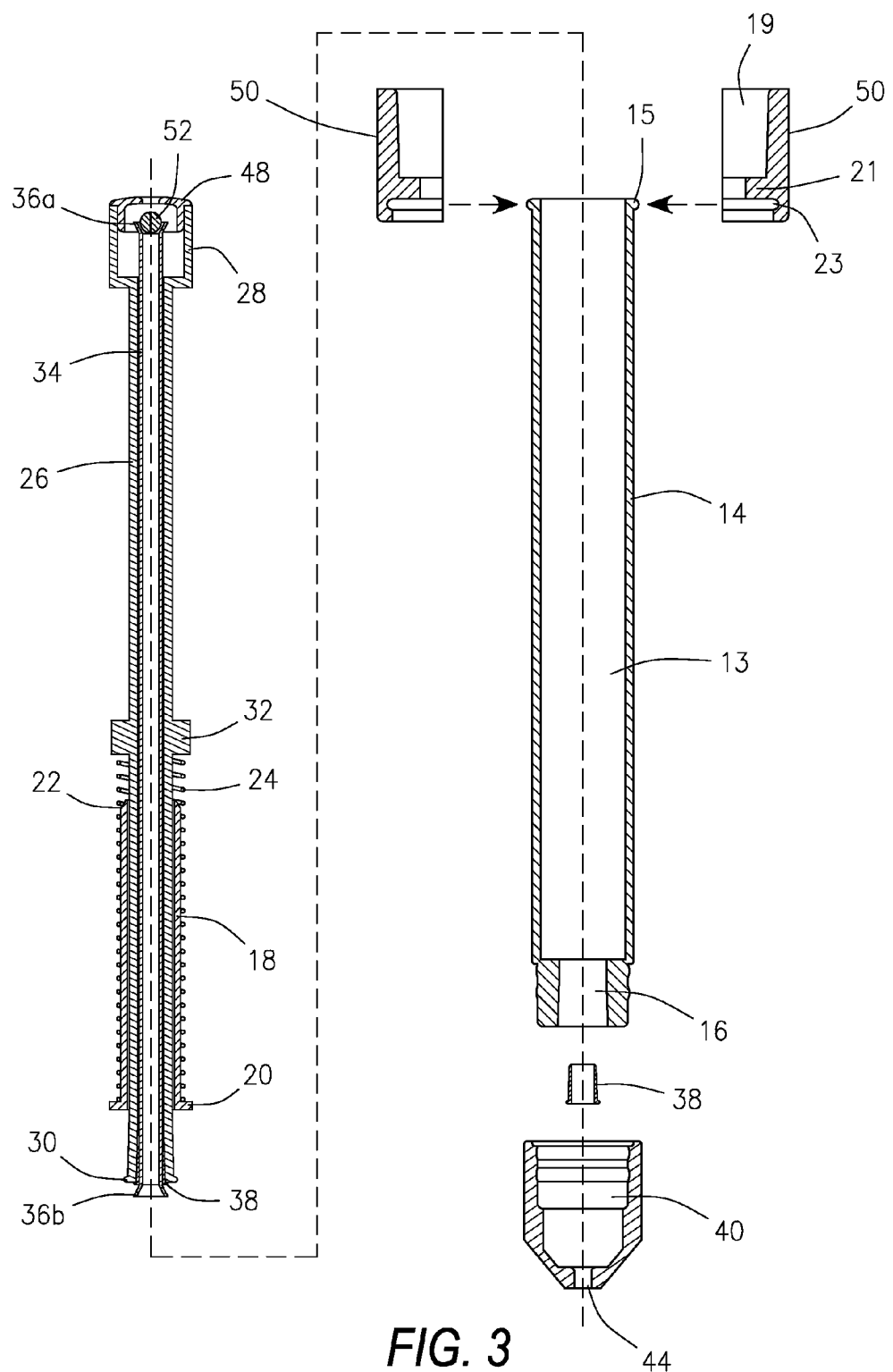
FIG. 3 is an exploded view of the trigger assembly shown in FIG. 2 along with an example of a housing in accordance with an illustrative embodiment of the invention disclosed herein.

Referring initially to FIGS. 1 through 3, the fish hook setting device 10 includes an elongated housing 14 that is received within the central longitudinal bore of the floater 12. The housing 14 includes an open upper end and an open lower end creating a longitudinal passage 13 therebetween. As illustrated, the open upper end of the housing 14 may include a radially protruding shoulder 15, and the open lower end includes a restricted outlet 16. An end cap 40 may be attached to the lower end of the housing 14, and the end cap 40 may include an extension space 42 for a trigger rod 34 and a collet 38. An outlet 44 in the end cap 40 allows for the passage of fishing line 46.

The housing 14 is retained within the bore of the floater 12, such as by using a retaining chamber 17, which in the example illustrated in FIGS. 1 through 6, is formed by bisected components 50. The chamber 17 is positioned within the upper end and abuts a shoulder within the bore of the floater 12. The chamber 17 includes an upper receptacle 19, an intermediate shoulder 21, and a lower internal channel 23 for receipt of the shoulder 15 on the upper end of the housing 14. The chamber 17 has a longitudinal bore 25 therethrough that is axially aligned with the longitudinal passage 13 of the housing 14.

A biasing member support 18 may be slideably received within the housing 14. The biasing member support 18 has a tapered upper end 22 and a flanged lower end 20. A biasing member 24 is positioned about the biasing member support 18, and a lower end of the biasing member 24 is supported by the flange 20 of the biasing member support 18. The biasing member 24 can be a coiled spring or other device for implementing a biasing force. The biasing member support 18 also includes a central longitudinal bore, and the biasing member 24 and the biasing member support 18 are axially aligned and concentrically positioned within the longitudinal passage 13 of the housing 14.

The fish hook setting device 10 also includes a collet shaft 26 having a longitudinal passage 27, an upper portion terminating with a receptacle 28, a lower portion terminating with a tapered outer collar 30, and an intermediate biasing member stop 32. A cap 48 may be engaged with the receptacle 28 of the collet shaft 26. The collet shaft 26 is concentrically and slideably positioned within the longitudinal passage 13 of the housing 14. The biasing member support 18 and the biasing member 24 are concentrically positioned about the lower portion of the collet shaft 26, with a top end of the biasing member 24 abutting a lower face of the biasing member stop 32 and a lower end of the biasing member 24 abutting an upper face of the flanged lower end of the biasing member support 18.

Figures 4, 5, 6:
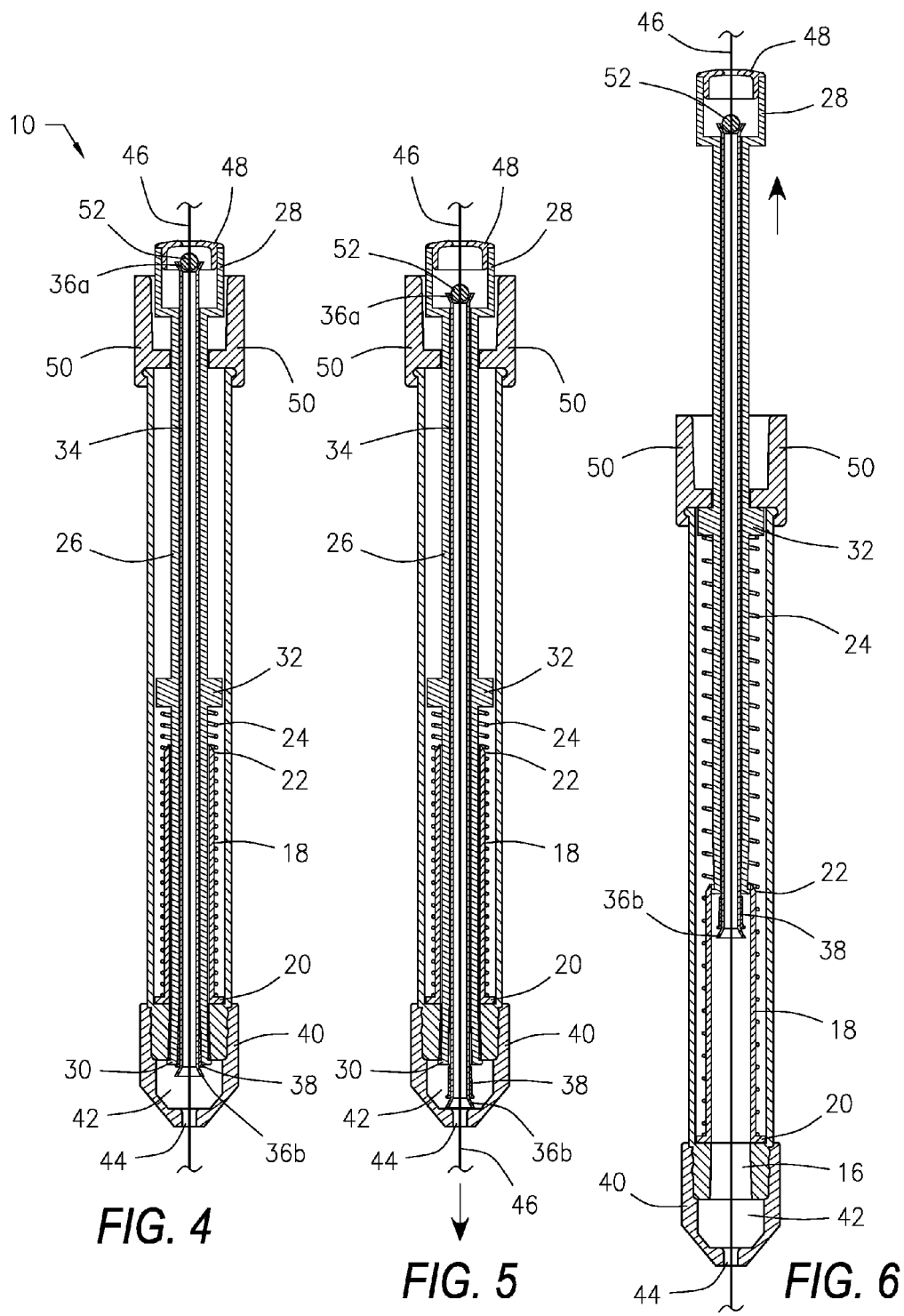
FIG. 4 is a sectional view of the fish hook setting device shown in a cocked position.
FIG. 5 is a sectional view of the fish hook setting device shown being triggered.
FIG. 6 is a sectional view of the fish hook setting device shown in an un-cocked position.

A trigger rod 34 is slideably positioned within the longitudinal passage 27 of the collet shaft 26 of the fish hook setting device 10. The terminal ends of the trigger rod 34 each have tapered outer collars 36a/b. The lower terminal end 36b of the trigger rod 34 is engaged with a collet 38 that is used to lock the telescoping trigger rod 34 and the collet shaft 26 together. The collet 38 includes a central bore with an inside diameter generally equal to an outside diameter of the trigger rod 34, and may have a tapered upper end and a flanged lower end. The tapered upper end of the collet 38 has an outside diameter slightly less than an inner diameter of the collet shaft 26, while the flanged lower end of the collet 38 has an outside diameter slightly greater than the inner diameter of the collet shaft 26. As is fully discussed below, the increasing outside diameter of the collet 38 forces the lower end of the collet shaft 26 to expand and be pushed against the inner wall of the restricted outlet 16 of the housing 14 thus locking the trigger rod 34, the collet shaft 26 and the housing 14 together when the fish hook setting device 10 is in a cocked position (FIG. 4). The lower end of the collet shaft 26 may be slotted to facilitate this expansion.

The fishing line 46 passes through the cap 48, and includes an upper line stop 52. The fishing line 46 is fed through the receptacle 28 of the collet shaft 26, the longitudinal passage 29 of the trigger rod 34 and exits the fish hook setting device 10 through the restricted opening 16 of the housing 14 and the outlet 44 in the end cap 40. The fishing line 46 is associated with a fishing hook and bait (not shown) beyond the lower end of the device 10.

Turning now to FIGS. 4 through 6 illustrating the fish hook setting device 10 in in the cocked, or set, position (FIG. 4), being triggered from a fish biting at bait that may be attached to the fishing line 46 (FIG. 5), and in a un-cocked, or triggered, position (FIG. 6). During use, the cap 48 is pressed down to set the fish hook setting device 10. The cap 48 is in communication with the receptacle 28 such that when the cap 48 is pressed down, the collet shaft 26, along with the trigger rod 34, are pressed in the downward direction along the longitudinal passage 13 compressing the biasing member 24 between the biasing member stop 32 and the flanged lower end 30 of the collet shaft 26. The tapered outer collar 30 of the lower portion of the collet shaft 26 is received and retained in the restricted outlet 16 of the housing 14. The collet 38 is wedged between the tapered outer collar 36b at the lower end of the trigger rod 34 and the flanged lower end 30 of the collet shaft 26.

When a fish bites the bait, the fish pulls the fishing line 46 pulling the line stop 52 into engagement with the upper tapered collar 36a of the trigger rod 34. The pulling force of the line stop 52 against the upper tapered collar 36a moves the trigger rod 34 and the collet 38 downward out of the collet shaft 26 and into the extension space 42 in the end cap 40. Once the engagement and compressive forces between the collet 38, the trigger rod 34 and the collet shaft 26 are removed by the downward pulling, the biasing member 24 de-compresses, forcing the collet shaft 26 with the trigger rod 34 upwards and out of the passage 13 of the housing 14. The trigger rod 34 carries the line stop 52 upwards resulting in the hook being set into the mouth of the fish.

Figure 7:
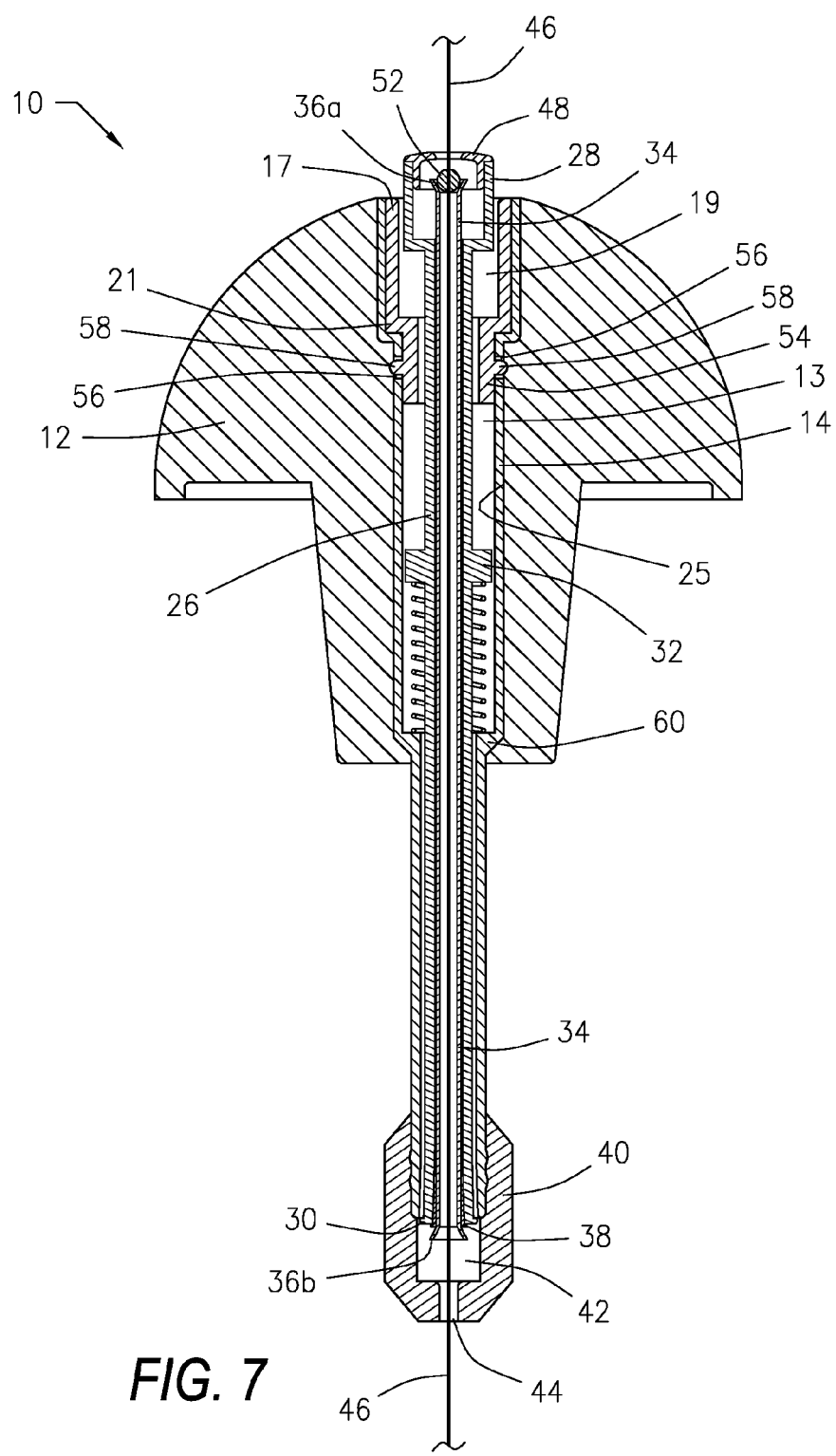
FIG. 7 is a sectional view of another example of a fish hook setting device in accordance with an illustrative embodiment of the invention disclosed herein.

Turning now to FIG. 7 exemplifying another example of the fish hook setting device 10 disclosed herein. Similarly to the first example, the fish hook setting device 10 may be used in conjunction with a floater 12. The floater 12 includes a central longitudinal bore having a lower end and an upper end. The bore at the lower end of the floater 12 includes a segmentary shoulder 60. The housing 14 includes an open upper end and an open lower end creating the longitudinal passage 13 therebetween. The end cap 40 attached to the lower end of the housing 14 includes the extension space 42 for the trigger rod 34 and the collet 38.

The chamber 17 exemplified in FIG. 7 is constructed as an insert 54 that is secured within the upper end of the passage 13 of the housing 14. The upper end of the housing 14 includes at least one opening 56 for receipt of at least one depressible latch 58 on the insert 54. The collet shaft 26 is slideably positioned within the longitudinal passage of the housing 14, and the biasing member 24 is concentrically positioned about the lower portion of the collet shaft 26, with a top end of the biasing member 24 abutting a lower face of the biasing member stop 32 and a lower end of the biasing member 24 abutting a segmentary shoulder 60 of the housing 14.

In use, when the cap 48 is pressed down, the collet shaft 26, along with the trigger rod 34 are pressed in the downward direction along the longitudinal passage 13 compressing the biasing member 24 between the biasing member stop 32 and the segmentary shoulder 60 of the housing 14. When a fish bites the bait, the fish pulls the fishing line 46 pulling the line stop 52 into engagement with the upper tapered collar 36a of the trigger rod 34. The pulling force of the line stop 52 against the upper tapered collar 36a moves the trigger rod 34 and the collet 38 downward out of the collet shaft 26 and into the extension space 42 in the end cap 40. Once the engagement and compressive forces between the collet 38, the trigger rod 34 and the collet shaft 26 are removed by the downward pulling, the biasing member 24 de-compresses against the segmentary shoulder 60 of the housing 14, forcing the collet shaft 26 with the trigger rod 34 upwards and out of the housing 14. The trigger rod 34 carries the line stop 52 upwards resulting in the hook being set into the mouth of the fish.

Whereas, the invention has been described in relation to the drawings and claims, it should be understood that other and further modifications, apart from those shown or suggested herein, may be made within the scope of this invention.

What is claimed is:

1. A fish hook setting device, comprising:
   an elongated housing having an upper end, a lower end and a longitudinal passage;
   a collet shaft having a longitudinal passage, an upper portion a lower portion, and an intermediate shoulder, said collet shaft slideably positioned within said longitudinal passage of said elongated housing;
   a trigger assembly positioned within said longitudinal passage of said elongated housing, said trigger assembly engaged with said collet shaft, said trigger assembly further comprising a fishing line passage; and
   a biasing member positioned within said longitudinal passage of said elongated housing, said biasing member engaged with said collet shaft;
   wherein said device has a cocked state and an un-cocked state with said biasing member being compressed in said cocked state and said biasing member being decompressed in said un-cocked state;
   wherein said collet shaft, said trigger assembly and said biasing member are coaxially aligned within said longitudinal passage of said elongated housing.

2. The fish hook setting device of claim 1 wherein said trigger assembly further comprises:
   a trigger rod having said fishing line passage, an upper terminal end and a lower terminal end, said trigger rod slideably positioned within said longitudinal passage of said collet shaft; and
   a collet concentrically positioned between said lower portion of said collet shaft and said lower terminal end of said trigger rod.

3. The fish hook setting device of claim 1 further comprising a buoyant floater having a longitudinal bore with a lower end and an upper end.

4. The fish hook setting device of claim 3 wherein said housing is retained within said upper end of said longitudinal bore of said floater by a retaining chamber.

5. The fish hook setting device of claim 1 wherein said retaining chamber further comprises:

an upper receptacle;

an intermediate shoulder; and a longitudinal bore.

6. The fish hook setting device of claim 5 wherein said retaining chamber further comprises a pair of bisected components having an internal channel.

7. The fish hook setting device of claim 6 wherein said upper end of said housing comprises a radially protruding shoulder retained within said internal channel of said retaining chamber.

8. The fish hook setting device of claim 5 wherein said retaining chamber further comprises an insert constructed to fit within said upper end of said housing.

9. The fish hook setting device of claim 8 wherein said insert further comprises a depressible latch capable of being received into a latch opening in said upper end of said housing.

10. The fish hook setting device of claim 1 further comprising a biasing member support having a tapered upper end, a flanged lower end, and a central longitudinal bore, said biasing member support engaged with said biasing member.

11. The fish hook setting device of claim 10 wherein said biasing member and said biasing member support are concentrically positioned about said lower portion of said collet shaft, and wherein said biasing member is positioned between said intermediate stop of said collet shaft and said flanged lower end of said biasing member support.

12. The fish hook setting device of claim 1 wherein said housing further comprises a segmentary shoulder engaged with said biasing member.

13. The fish hook setting device of claim 1 wherein said collet shaft further comprises:

a receptacle terminating at said upper portion; and a tapered outer collar terminating at said lower portion.

14. The fish hook setting device of claim 13 further comprising an upper cap in communication with said receptacle of said collet shaft.

15. The fish hook setting device of claim 1 further comprising an end cap attached to said lower end of said housing, said end cap comprising an extension chamber and an outlet.

16. The fish hook setting device of claim 1 wherein said collet shaft has at least one slot opening at said lower portion of said collet shaft.

17. A fish hook setting device, comprising:

a housing having an upper end, a lower end and a longitudinal passage;

a collet shaft slideably positioned within said longitudinal passage of said housing, said collet shaft comprising an upper end, a lower end, an intermediate stop, and a longitudinal passage;

a trigger rod slideably positioned within said longitudinal passage of said collet shaft;

said trigger rod having an upper terminal end, a lower terminal end and a fishing line passage;

a collet concentrically positioned between said lower end of said collet shaft and said lower terminal end of said trigger rod; and a biasing member positioned within said longitudinal passage of said housing, said biasing member engaged with said intermediate stop of said collet shaft;

wherein said collet shaft, said trigger rod and said collet are coaxially aligned with said longitudinal passage of said housing.

18. The fish hook setting device of claim 17 further comprising a chamber constructed of a pair of bisected components having an internal channel, and said upper end of said housing having a radially protruding shoulder retained within said internal channel of said chamber.

19. The fish hook setting device of claim 17 further comprising a chamber having an insert constructed to fit within said upper end of said housing, said insert comprising a depressible latch capable of being received into a latch opening in said housing.

20. The fish hook setting device of claim 17 further comprising an end cap at said lower end of said housing, wherein said end cap comprises an extension chamber and an outlet.

* * * * *